United States Patent [19]
Hamilton et al.

[11] Patent Number: 5,987,501
[45] Date of Patent: Nov. 16, 1999

[54] MULTIMEDIA SYSTEM HAVING SERVER FOR RETRIEVING MEDIA DATA AS INDICATED IN THE LIST PROVIDED BY A CLIENT COMPUTER

[75] Inventors: James Hamilton, Carlisle, Mass.; Richard Hennessy, Nashua, N.H.; Pong Choa, Cambridge, Mass.; Avinash Chopde, Andover, Mass.; Eric Peters, Carlisle, Mass.; Jay Koutavas, Nashua, N.H.

[73] Assignee: Avid Technology, Inc., Tewksbury, Mass.

[21] Appl. No.: 09/115,012

[22] Filed: Jul. 14, 1998

Related U.S. Application Data

[63] Continuation of application No. 08/804,521, Feb. 20, 1997, Pat. No. 5,799,150, which is a continuation of application No. 08/215,849, Mar. 21, 1994, abandoned.

[51] Int. Cl.[6] .................................................. G06F 13/00
[52] U.S. Cl. .............................................. 709/203; 348/7
[58] Field of Search ..................................... 709/203, 217, 709/219, 226; 348/7, 12

[56] References Cited

U.S. PATENT DOCUMENTS

| | | | |
|---|---|---|---|
| 5,544,297 | 8/1996 | Milne et al. | 345/302 |
| 5,630,060 | 5/1997 | Tang et al. | 709/238 |
| 5,737,549 | 4/1998 | Hersch et al. | 710/129 |

*Primary Examiner*—Moustafa M. Meky
*Attorney, Agent, or Firm*—Wolf, Greenfield & Sacks, P.C.

[57] ABSTRACT

The problems of latency, flow control and data loss, and data movement within a client system memory are solved in a distributed multimedia system so as to enable real-time transmission of broadcast quality media data over the network. Latency is reduced by an estimation by the server of client needs. Data loss is prevented and flow control is provided by permitting the server to send only as much information as the network interface can reliably receive. Data movement is minimized by copying data directly from the network interface to memory in a display processor or audio processor.

1 Claim, 6 Drawing Sheets

MULTIMEDIA SYSTEM HAVING SERVER FOR RETRIEVING MEDIA DATA AS INDICATED IN THE LIST PROVIDED BY A CLIENT COMPUTER

This application is a continuation of application Ser. No. 08/804,521, filed Feb. 20, 1997, entitled SYSTEM FOR SENDING LIST OF MEDIA DATA OBJECTS TO SERVER WHICH MAY BE READ BY CLIENT AND RECEIVING FROM THE SERVER INDICATOR OF ALLOCATED RESOURCE, and now U.S. Pat. No. 5,799,150, which is a file wrapper continuation of application Ser. No. 08/215,849, filed Mar. 21, 1994, entitled AN APPARATUS AND COMPUTER-IMPLEMENTED PROCESS FOR PROVIDING REAL-TIME MULTIMEDIA DATA TRANSPORT IN A DISTRIBUTED COMPUTING SYSTEM, and now abandoned.

FIELD OF THE INVENTION

This invention is related to systems and processes for maximizing media data transfer rates in distributed multimedia computer systems.

More particularly, this invention relates to systems and processes for preventing loss of media data during media data transfer between a client and a server in a distributed multimedia system.

This invention also more particularly relates to systems and processes for retrieving media data with minimum latency from a disk-based media data server such that a client multimedia application has access to sufficient broadcast quality media data.

BACKGROUND OF THE INVENTION

A variety of kinds of digital multimedia computer systems are now available. Multimedia systems typically use digital audio and digital image data, especially digital video. It should be understood that in this context, digital video means a sequence of two-dimensional digital still images without any synchronization or other timing information typically associated with a video signal such as a television signal. These systems generally fall into one or more of three broad categories: capture, authoring, and playback.

Capture involves generating digital media from typically analog media. For example, video signals on a video tape or on film are converted into a sequence of two-dimensional digital still images. These images are typically compressed using known compression systems so as to reduce storage requirements.

Authoring systems, such as the AVID/1 Media Composer, commercially available from Avid Technology, Inc. of Tewksbury, Mass., allow a user to generate multimedia programs, for example by editing source material or by generating information like computerized graphics. Portions of the source material are called clips. For example, multiple takes of a scene in a film could be captured. An authoring system could be used to edit clips from these takes into an appropriate final version of the scene.

Playback systems are used to display a multimedia program to a viewer. The program typically is previously edited by an authoring system using previously captured material. The display medium may be, for example, broadcast television or conversion to video signals to create a video tape or video disk, a computer display, etc. Thus, playback generally involves retrieval and transmission of the digital media from storage to the display location according to the specified program and may involve conversion of the digital media to an analog form. Very often an authoring system includes a form of playback system.

In some industries, all three of these kinds of systems are used in day-to-day operations. For example, in a broadcast or cable television system, media is captured from satellite, cable or another source. A program is then edited from this material. For example, video and audio footage of news events from around the world may be transmitted via satellite and captured by a broadcast station, which then prepares a news program. The final news program is then played back for broadcast. As another example, in the film industry, media may be captured, and then played back by a director to determine whether any more takes of a given scene would be required. Authoring systems are also becoming more commonly used to facilitate the editing process of a film. After a digital version of the film is completed, this version is used to create a final film product.

In facilities where there may be many users of the same multimedia material, using multiple types of multimedia systems, a need has arisen to provide these capabilities in a distributed computing environment which allows real-time access to and viewing of multimedia information. Real-time access signifies data rates which support providing broadcast quality video at a client. That is, real-time access involves the ability to play, cut and paste, view a single frame and provide fast forward (or reverse) access to video information at a server. This also may signify an ability to recover from a worst-case disk access. Generally, data transfer rates of about five (5) megabytes per second (Mbps) are preferable. Real-time audio and video systems also require large amounts of data to be transferred. These transfer rates and amounts should be achieved without loss and with minimal latency.

To this day, no systems are commercially-available to handle adequately the data transfer requirements of such multimedia systems, particularly broadcast quality video. Because such distributed systems are not currently commercially-available, users and television stations or film studios or post-production facilities typically have to different machines in order to perform the various capture, authoring, and playback activities, which is generally undesirable. Alternatively, all of these activities are performed on a single machine.

For other kinds of applications, there are several conventional methods for transferring large amounts of data between a server and a client in a distributed computer system over a network interconnection. In a first method, a server transmits the data, in bulk, directly to a client. Traditional distributed computing systems utilize a widespread industry practice of a disk server system coupled with an in-memory data cache to provide a mechanism that a client may use to read data. The file system of the underlying operating system performs larger than requested disk reads in an attempt to fill the cache with information that the system estimates the client will need next. One problem with this method is that the client has no control over selection of data, or timing of the transfer.

In a second method, the client periodically and unpredictably makes requests for data from the server. One problem with this method is that a delay (latency) is incurred while the server prepares the data for delivery, for example, by reading it from a local disk into system memory. This class of systems will not provide the minimum latency required by a media data pipeline operating in a variable consumption rate environment within a video and audio processing system.

Another problem with current systems is that they have not accounted for resource limitations along the path from the sender to the receiver. That is, when data, such as audio or video media data, is transmitted over a network, a flow control mechanism is required so that the sender does not transmit the data faster than the receiver can accept it. Otherwise, portions of the data packets may be lost in transmission even though the physical interconnect has not failed in any way. This packet loss is normally handled by retransmission, but the real-time requirements of multimedia playback, especially in a broadcast environment, preclude retransmission as a solution.

The Internet protocol, Transmission Control Protocol/Internet Protocol (TCP/IP), is an example of current networking industry practice. TCP/IP is an example of the use of an end-to-end window extension technique. The receiver extends a window to the sender. The sender sends until this window is consumed. The window only refers to the amount of protocol data unit (PDU) buffer memory available to the application. Network interface level buffering is not considered. If the buffers in the network interface are overflowed or congested, PDUs will be lost. TCP/IP was designed to operate in the face of a PDU loss on the interconnect between the sender and the receiver. The use of timeouts and sequence number checking on each message allows the sender and receiver to determine that a PDU or acknowledge message has been lost or corrupted while moving across the network from such a loss. Transmission retry is used to recover. The overhead of the retry and timeouts reduces the possible data transfer rate below that needed to support processing broadcast quality video and audio information.

Another common problem in distributed systems is that the receiver typically experiences significant overhead in identifying a final destination in user-level memory into which data is to be copied from an intermediate system buffer and the network interface. This overhead reduces the possible data transfer rate to levels that make impossible the movement of broadcast quality video and audio media data at sufficient speed.

SUMMARY OF THE INVENTION

The present invention overcomes the problems of latency, flow control and data loss, and minimizes data movement within a client system memory in a distributed multimedia system so as to enable real-time transmission of broadcast quality media data over the network.

Latency is reduced by an estimation by the server of client needs. Data loss is prevented and flow control is provided by permitting the server to send only as much information as the network interface can reliably receive. Data movement is minimized by copying data directly from the network interface to memory of input/output devices such as display and audio processors as well as main memory.

DETAILED DESCRIPTION

The present invention will be more completely understood through the following detailed description which should be read in conjunction with the attached drawing in which similar reference numbers indicate similar structures. All references cited herein are hereby expressly incorporated by reference.

Figure 1:
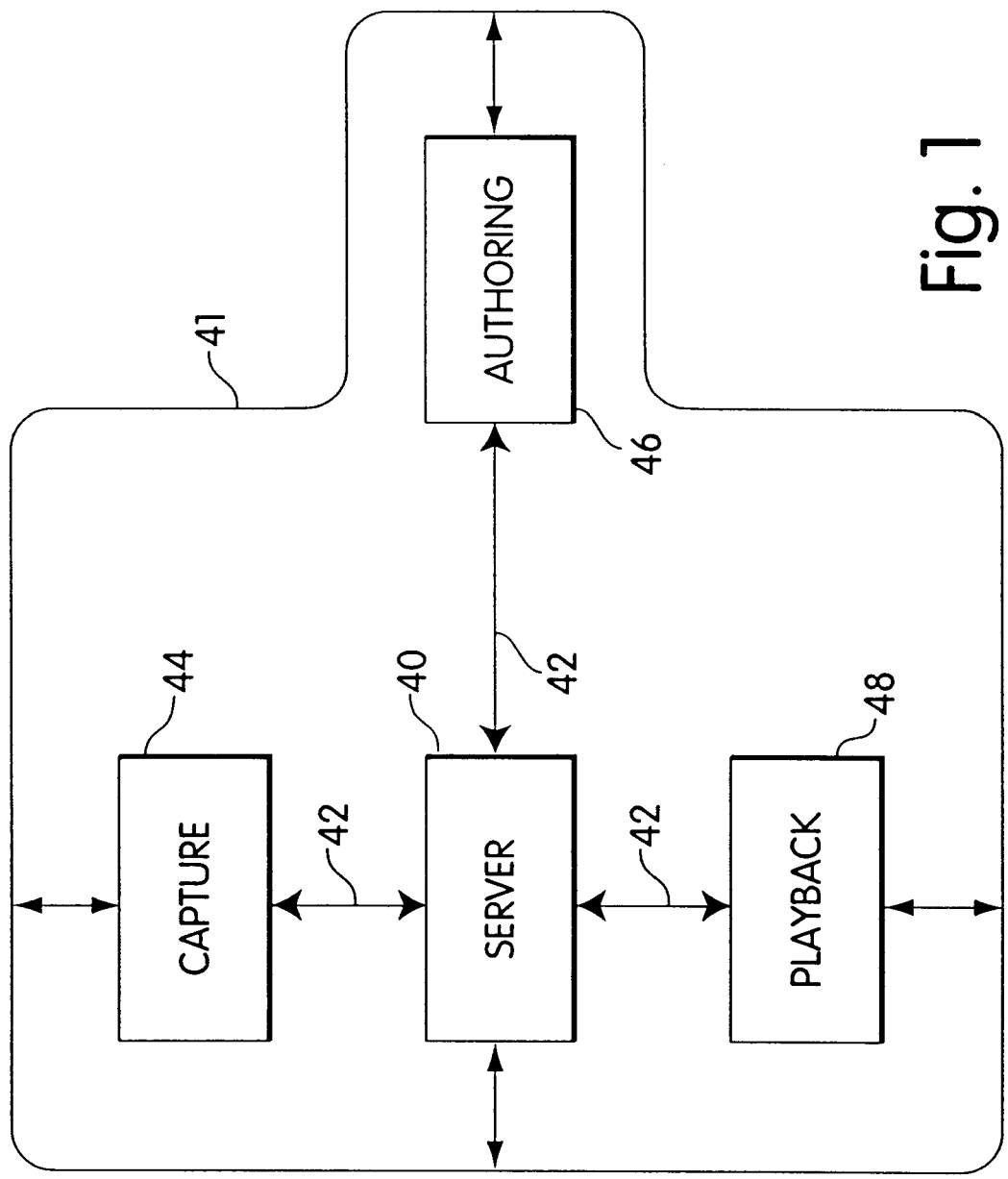
FIG. 1 is a block diagram of a distributed multi media computing system in accordance with this invention.

FIG. 1 illustrates a general structure of a distributed multimedia computer system suitable for practicing the invention. It includes a server 40 to which various client systems are interconnected via a high speed media transport 42. The media transport 42 is in a "star" configuration to provide full bandwidth for each client and to support failure recovery. The clients may generally include a capture system 44 and authoring system 46 and a playback system 48 as shown. Many other clients may exist and not all three types of multimedia systems are required.

To provide low bit error rates, the media transport 42 is preferably optical, e.g. a fiber distributed data interconnect (FDDI) or an asynchronous transfer mode (ATM) system. It should be used only for communicating messages involved in the transfer (i.e., reading and writing) of media data between the client and the server.

At the application level, there are two types of messages in this system: protocol requests/responses and media data packets. Protocol requests/responses occur at the application level of the interconnect between the client and the server. Media data transfer occurs at the transport level. Both types of messages are communicated over the media transport 42. There should be no other network traffic on the media transport 42.

To play two-field broadcast video, each client should have about five (5) megabytes/second (Mbps) of data bandwidth for one video stream and four audio streams. This bandwidth allows for three (3) Mbps of two-field, 100 kb/frame compressed video data, 96 Kb/sec for each 48 Khz audio channel and recovery bandwidth. Recovery bandwidth is defined as additional bandwidth needed to recover after a disk head move caused by any of a new video file extent access, a need for audio samples for one or more tracks, or spindle contention from two clients accessing the same disk simultaneously. Thus, with current technology an additional bandwidth of 1.5 Mbps is recommended so that the media transport 42 should allow for five (5) Mbps. Highly scalable bandwidth and single point management and monitoring are also benefits of this kind of interconnect.

The clients 44, 46, 48 and the server 40 may also be interconnected by a control network 41 which may be, for example, an Ethernet type of network. The control network 41 is used for management of media files and other resources through services of another system unrelated to the communications of media data. The control network 41 is also suitable for general administrative support.

As with any network, a connection between the server and the client has to be established before sending any data. The connection initialization process is independent of the protocol for media transport. The connection handshaking is typically done over the control network 41. It may also be done using another protocol on the media transport 42.

Figure 2:
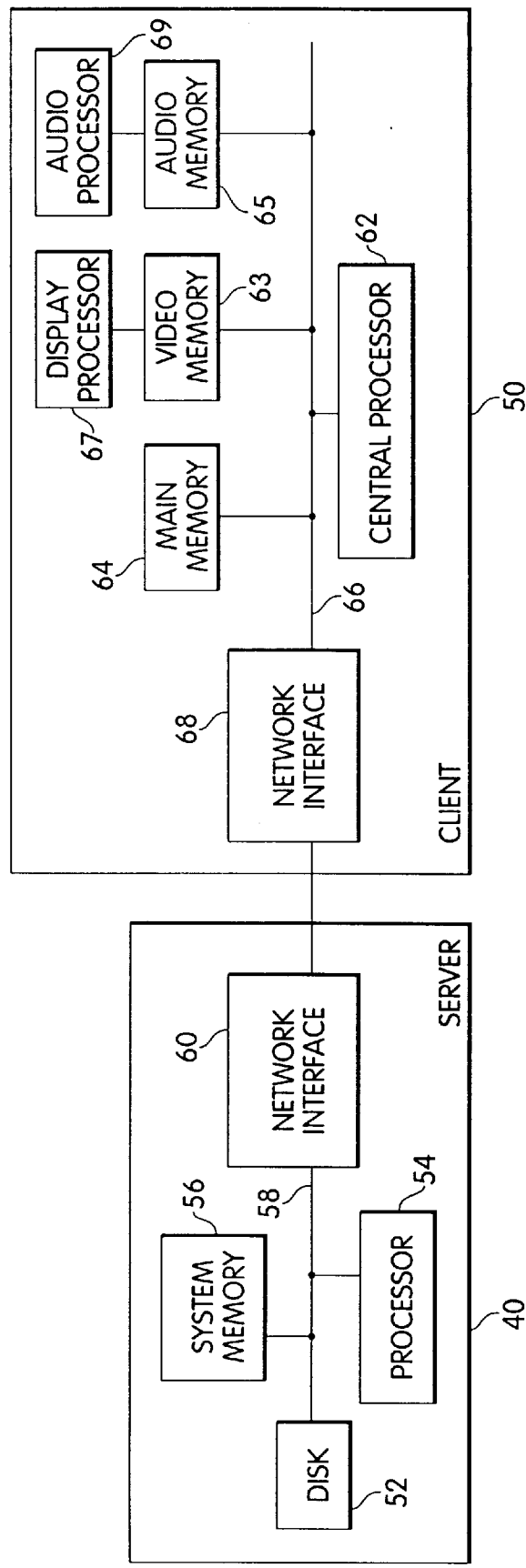
FIG. 2 is a more detailed block diagram of the client and server computers of FIG. 1.

As shown in FIG. 2, the server 40 includes a disk 52 on which the media data is primarily stored. The server 40 also includes a processor 54 and system memories 56 which are interconnected with the disk 52 via a bus 58. This bus 58 is also connected to a network interface 60 which connects to the media transport 42. A client 50 includes a central processor 62 and main memory 64 interconnected by a bus 66. Also connected to the bus are preferably video memory 63 and audio memory 65, which stores the multimedia data to be used respectively by display processor 67 and audio processor 69 to display video and play audio. This bus connects to a network interface 68 which connects the client 50 to the media transport 42, and thus to the server 40.

In the embodiment developed by the inventors, the client computers 44, 46, 48 are Macintosh Quadra 950 computers with twenty-eight (28) megabytes (Mb) of memory and Macintosh System 7.1 system software. The server computer is a Silicon Graphics Challenge L computer with 4 cpu, 100 megahertz (Mhz), 256 Mb of memory, 8 gigabytes (gb) of disk storage and the IRIX 5.2 operating system. The media transport 42 and network interface 60 is provided by an optical fiber with the FORE Systems ForeRunner VMA-200 ATM VMEbus Adapter for the server 40, and associated system software, and application program interface (API) library software. For the clients, a FORE Systems ForeRunner NBA-200 ATM NUBUS Adapter was used as the network interface 68, along with associated system software, and API library software. It should be understood that the invention is not limited to these specific machines and components mentioned and that other network interfaces and computers may be used.

Figure 3:
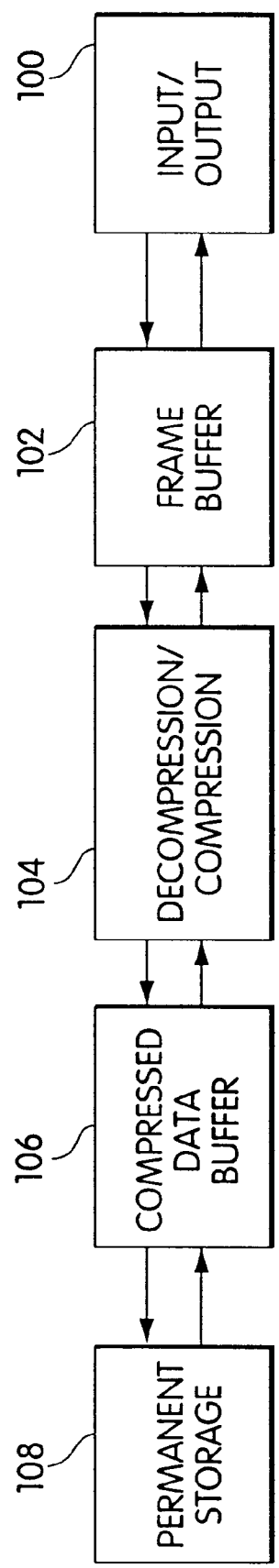
FIG. 3 is a block diagram describing a media pipeline as is used in the prior art.

The need for reading media data from the server 40 into a client is dependent on the need for the media data further down the processing stream, particularly by the display processor and audio processor. That is, this media data should be considered as being used in a sort of media pipeline, such as that described in U.S. Pat. No. 5,045,940, issued Sep. 3, 1991 and assigned to Avid Technology, Inc. of Tewksbury, Mass. In this system, as shown simplified in FIG. 3, video data is input through an input/output system 100. An audio stream is not shown. The data then goes to a frame buffer 102 from where it is then compressed using a decompression/compression system 104. Compressed data is stored in a buffer 106 from where it is then transferred into permanent storage 108. Conversely, data can be read from permanent storage 108 to the compressed data buffer 106 from where it is decompressed in 104 and applied to a frame buffer 102 from where it is then displayed by an output unit 100. In this system, processing by any one of the subsystems is delayed if the subsystem to which its output is provided cannot receive any more data. The general concept is to maintain the pipeline at a completely full state in all of its stages so as to maximize the quality of the video being seen. The distributed system in this invention would be primarily used so as to provide permanent storage 108 at a server 40 (FIG. 1) and to have the remainder of the subsystems 100–106 at a client. Thus, requests for media data from the server 40 come at times indicated by other subsystems of a media pipeline as media data is needed.

Having described a general structure of a distributed computer system and a network protocol for supporting this invention, its use in providing real-time broadcast quality video will now be described. Three general concepts are used to obtain the desired results. First of all, clients send some information to the server 40 in advance of requests for media data, which information allows the server to access the data from the disk and place it in faster system memory in advance of client requests, thus reducing latency. The server, in effect, is allowed to predict the requests from the client. This information is sent by the client to the server as a protocol request/response at the application level. Lossless flow control is provided by having a client authorize the server 40 to send only an amount of data which the network interface is capable of handling. Finally, protocol control and identity mechanisms are provided within data packets to be transferred. These protocol control and identity mechanisms are then used by the network interface to process the data and automatically and directly transmit it to an appropriate user-level memory buffer to avoid copying of data into system level memory at the client. These concepts will now be described in more detail.

How the server is informed in advance of the needs of the client will first be described. In either an authoring system or a playback system, it is simple to predict the media data which will be required by a client. For example, in a typical authoring system, the user selects from a directory a set of clips which will be used in the product to be edited. Upon the selection of these clips, a message may be sent to the server by the client requesting that those clips be prepared for delivery. Similarly, in a playback system, one typically knows in advance all of the clips which will be used in the program to be played. Both of these types of prediction can be readily performed using the Avid/1 Media Composer. For example, when editing using the Avid/1 Media Composer, a user selects a number of clips by selection from a directory. Also, as a program is being edited, a data structure is developed called a composition which indicates the relationships and ordering of clips used in the program. A list of clips needed can be readily determined and sent to the server to permit the server to prepare in advance the data needed to display these clips.

The sequence of steps performed to effect this prediction will now be discussed in connection with FIG. 4. First, the list of media objects to be used by the client is created by the client in step 120. The client then requests that the server create a data structure, herein called a TrackList, for storing the media objects for the list in step 122. The TrackList is a resource on the server. Subsequent requests by the client are used to populate,-or define the contents of, the TrackList. The order of these requests dictates the order of the entries in the TrackList, as will be described below. The server responds to the client with an identifier for the TrackList which the client then includes in any requests to the server for associating media objects with the TrackList. The server may refuse a request to create a TrackList due to lack of resources and reply with an error in step 124.

After an identifier of a TrackList is received, the client then sends, in step 126 a series of requests to open media files for media objects corresponding to the list created by the client. Each request includes an identifier for the media object to be opened, the identifier of the TrackList, and an indication of whether the media object is to be inserted at the beginning or end of the TrackList. The identifier of the media object includes the media file and a range of bytes within that media file.

For each request to obtain a media object, the server opens the media object in step 128 and associates it with the TrackList. The operation performed by the server opens a logical read stream to an existing media file, hereinafter called a flow, located on the server. The flow is a cache buffer which is allocated and linked to the TrackList. Thus, the TrackList is a list of flows. It is possible to obtain single frame access to media files by specifying a NULL identifier for the TrackList. In this instance, no resource reservations are made.

If this server contains the media file identified by the client request, it returns an identifier to the flow that was opened by it in step 130, which identifier the client includes with subsequent requests to read media data from this file. If a requested media file is not located on the server an error is returned. If an incorrect identifier for the TrackList is provided, an error-is also returned. IF the media file requested is in use by another client, an error is also issued due to a resource conflict.

After the appropriate requests to open media files for read access, the media data desired by a client for a track are placed in a window buffer (described below) associated with that track so that the media data are ready to be accessed upon a read request. Using the predictive information in the TrackList the server will already have read the needed media data into the window buffer and can immediately fulfil the request.

Figure 5:
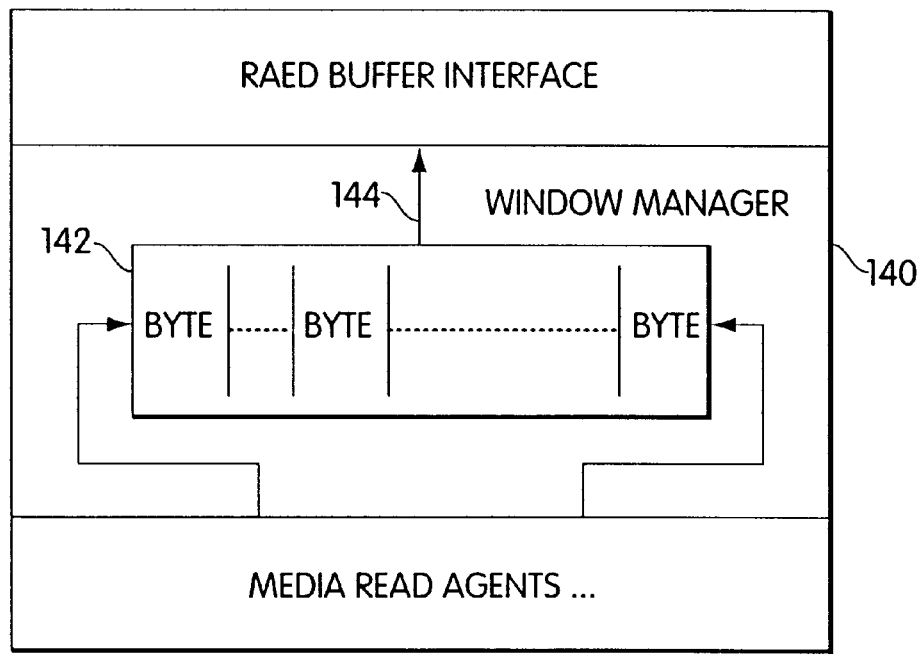
FIG. 5 illustrates a window buffer manager at the server used to anticipate client requests for media data.

As shown in FIG. 5, a window manager 140 at the server 40 is responsible for maintaining a window about a currently active point 144 in the window buffer 142 by doing autonomous read forward or backward operations. Reading sample data with minimum server turn-around delay is thus obtained because the server can do look ahead disk reads to fill the window buffer 142 for the next flow while the current flow is still being read by client. The TrackList allows the server to autonomously look ahead according to the information about the order of play of the streams, thus maintaining this window buffer 142 full. These read ahead operations for the media objects references by the TrackList can be performed such that the window buffer 142 will always contain the exact data needed to satisfy subsequent read operations.

Figure 6:
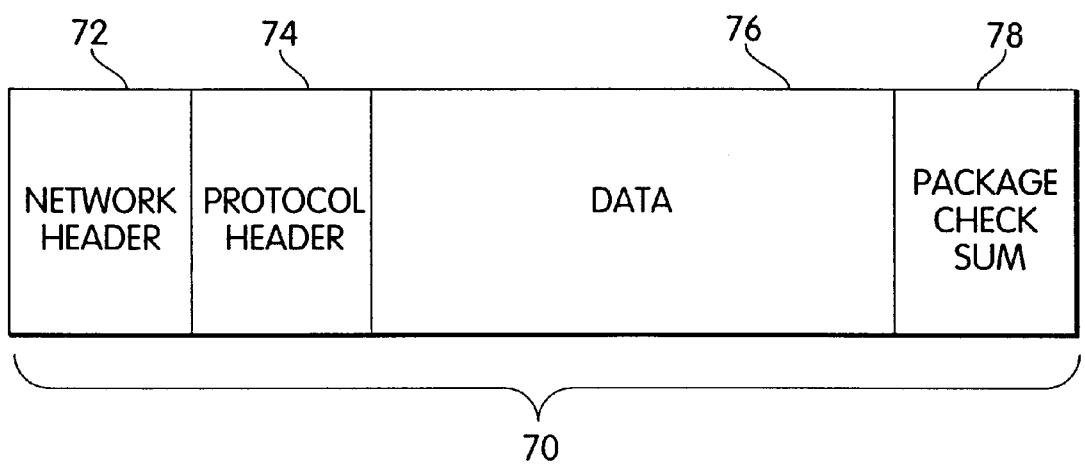
FIG. 6 is an illustration of a packet as may be used in accordance with a protocol in this invention.

When the media data is prepared in the window buffer by the server, the server 40 is ready to handle read requests from the client, which will now be described in connection with FIGS. 6–8. The preparation activities are performed at the application level; mechanisms for reading are performed at the transport level as will be described below.

To enhance throughput for reading media data in this system, a new network interface and protocol was developed for use at the transport level.

Figure 7:
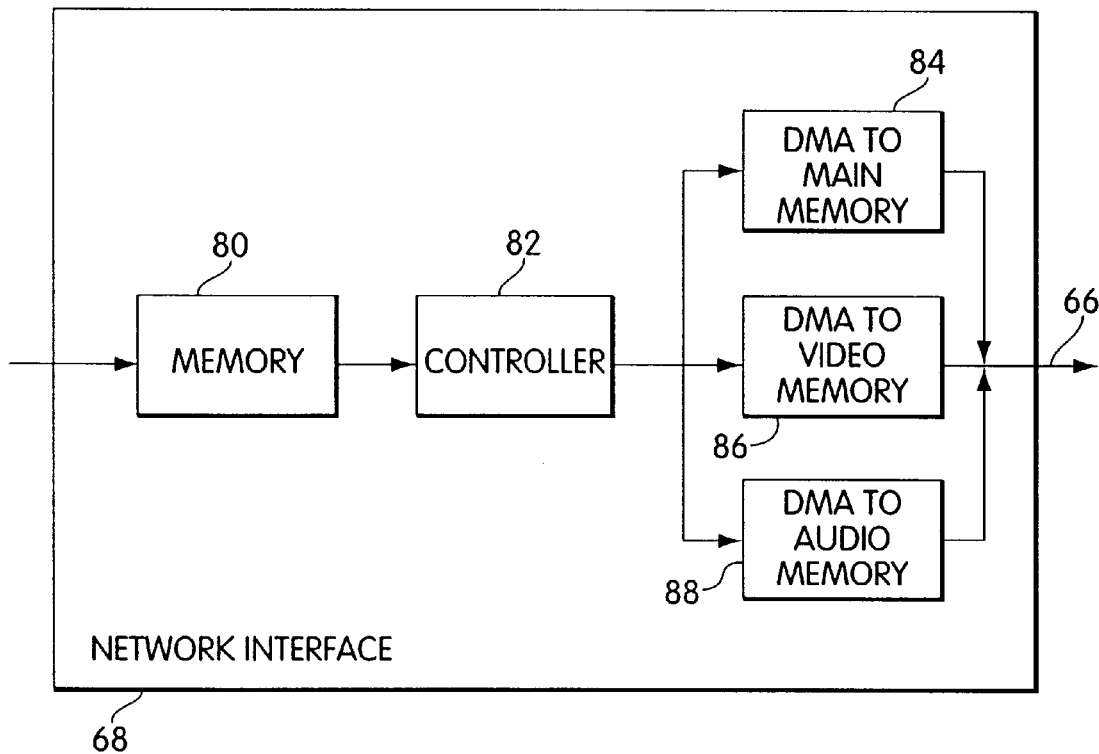
FIG. 7 is a block diagram of a network interface for a client computer.
Figure 8:
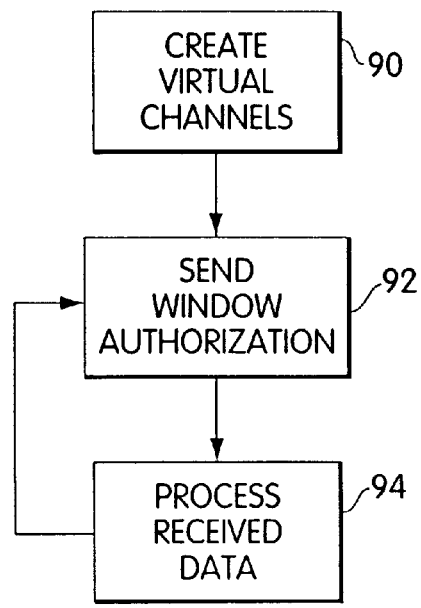
FIG. 8 is a flow chart describing how a client computer receives information.

As shown in FIG. 7, the network interface 68 includes a memory 80, preferably a first-in, first-out (FIFO) memory for receiving packets from the media transport 42. The memory 80 is controlled by a controller 82 which reads packets from the memory 80, and then transfers the data portion of those packets, thus multiplexing the packets, to logically separate direct memory access (DMA) elements 84, 86 and 88 which are connected to the system bus 66. Media data of a video track goes to the logical DMA to video memory 66. Similarly, audio data is sent to the logical DMA to audio memory 88. Finally, control data are sent to the logical DMA to main memory 84.

As discussed above, the client creates a TrackList for each track in the media program to be played, authored or captured. Likewise, a receive channel is also created by the client for each of these tracks to receive media data. The server similarly opens the same number of transmit channels, each associated with a TrackList. A channel is a logical construct used to control flow of data between the network interface and main memory or audio or video memory. More particularly, a channel is a half-duplex virtual circuit with a logical DMA control scheme, a flow control scheme (to be described below) and associated state information (as discussed below). Each channel has a separate logical DMA controller. Thus the interface of FIG. 7 represents two media data channels. Both the server and the client have a similar command channel which is used for communicating data concerning protocol requests and responses and other control information. As discussed above, each transmit channel at the server is organized as a cache, or window buffer, into the stream of bytes being read by the client as discussed above in connection with FIG. 5.

The network interface maintains a set of state information for each active receive channel. This information includes 1) an offset in bytes from the start of a packet to the start of the field storing the identifier for the receive channel, 2) an indication of the length in bytes of the identifier of this receive channel, 3) the identifier used by the network interface to identify this receive channel, 4) an offset in bytes from the start of a packet to the start of data, 6) a queue of all receive requests for this channel, each receive request indicating a starting address in the destination memory and size of the transfer units (discussed below) authorized to be sent for the request to this receive channel (to be described below), and 7) a count in bytes of data transferred by the network interface for this receive channel to this point in time. For each channel items 1), 2) and 4) are long lasting and should not change in real time. The network interface maintains state variables for the remainder. The network interface also maintains a global state variable indicative of an amount of data that it has authorized to be received by the network interface.

The network interface also maintains a set of state information for each active transmit channel. This information includes 1) an offset in bytes from the start of a packet to the start of the identifier for a channel, 2) an indication of the length in bytes of the identifier, 3) an indication of the token used by the network interface to identify the transmit channel, 4) an offset in bytes from the start of the packet to the start of data, 5) a queue of transfer requests, each request indicating a) a starting address of the source buffer from which the network interface will move the data, b) an offset in the source buffer from where the media data will be taken and c) an indication of the total number of data bytes to transfer from the indicated address, and 6) stream protocol header information, used by the network interface to encapsulate the retrieved data bytes into a proper network packet. The network interface also keeps track of the number and size of transfer units authorized for each transmit channel and the number of outstanding bytes authorized to be transmitted to a given destination address.

Figure 4:
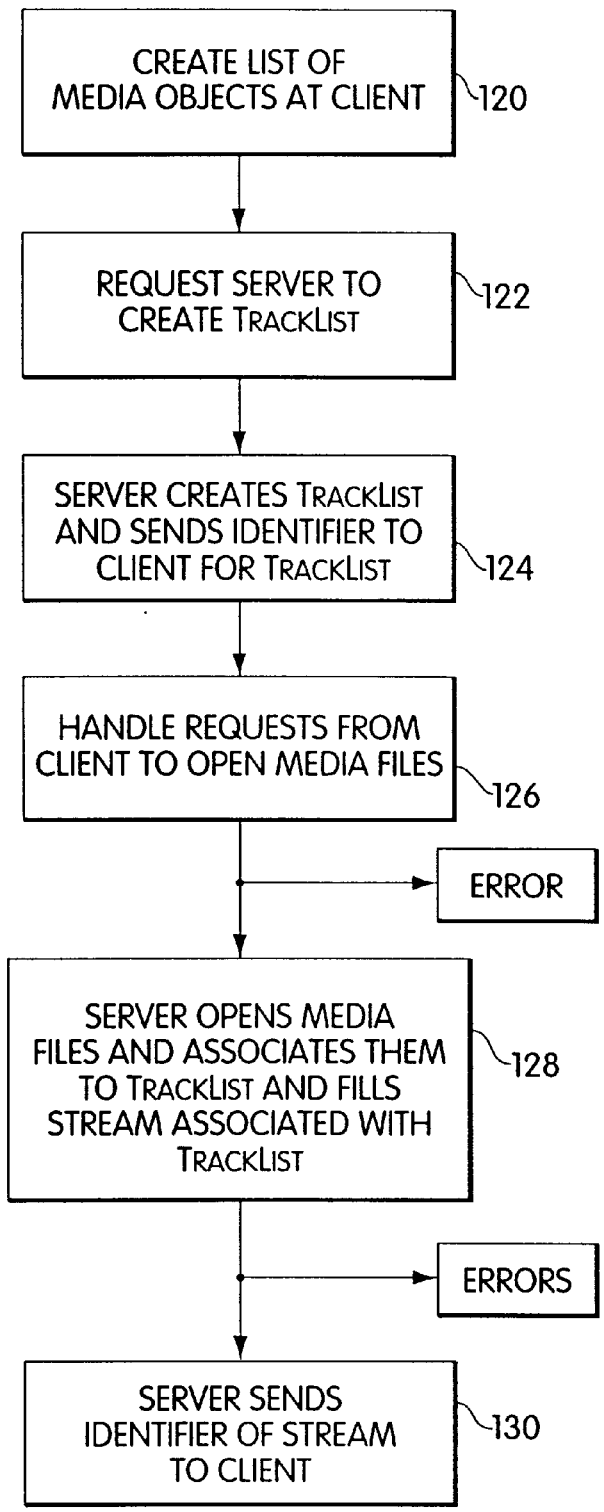
FIG. 4 is a flow chart describing how a server computer prepares to send data to client computer.

In this protocol, as shown in FIG. 4, a message is encapsulated within a packet 70. This format includes a network header 72, a protocol header 74, data 76, and a packet of package check sum 78. The network header 72 includes the indications of the sender and receiver of the packet and often other control information. The protocol header indicates the type of packet being received within the protocol. At the transport level, there are two types of packets for media transport in this protocol: data packets and window packets.

Data packets contain an arbitrary amount of data. Such packets may be media data packets for media channels or protocol request/responses data for command channels. A data packet contains in the protocol header 74 an indication of the receive channel at the destination and, in data portion 76, a block of data destined for the receive channel indicated. The amount of data in the packet and the offset in bytes in the destination buffer where the network interface will move the data are also included in the protocol header 74.

Window packets indicate information used by the server to control the amount of data sent to the client. A window packet includes an indication of the channel at the source of the window packet to which data is to be sent (i.e., the destination of the requested data) an indication of whether an additional transfer unit is authorized, as well as a number of bytes which is authorized to be sent. A window packet authorizes the server to transmit either one additional transfer unit on a given virtual channel or N additional bytes on the network interface, or both. The first of these allows the source of the window packet to prevent the transmission of packets for which no receive buffers are available. The second ensures that the flow of data does not overrun the capabilities of the network interface card to buffer packets for delivery to the source of the window packet. How these window packets are used will be described in more detail below.

The network interface (FIG. 7) is used in the following manner to control flow between the sender or server 40 and client 50. First, as mentioned above for each track in a multimedia program, a virtual receive channel is created. That is, for example, a video program typically has at least one track of video data and one track of audio data. A virtual receive channel is created for each of these tracks by the client in step 90 of FIG. 8. For each virtual receive channel at the client a logical DMA is created in the network interface 68. When the client places a request to the server for media data, an identifier of the receive channel to which media data will be sent is included, along with an indication of the media file to be accessed and an amount of data requested from it, called a transfer unit, is also provided. This request is made at the application level after the TrackList for the channel is established. Next, at the transport level, a window packet is sent in step 92, authorizing one transfer unit to be sent to this receive channel. However, the virtual receive channel only has a given size S, i.e., a maximum amount of data that it may hold. The ability of the network interface to buffer data is also limited. Thus, the window packet authorizing a transfer unit only authorizes a number of bytes to be sent which is less than the size S of the virtual channel. Typically, the first transfer for a program includes both, as identified above. However, if an application is playing a number of media files, a media file in the middle of the program may be requested while another is already in memory at the client. Thus, a transfer unit may be authorized by such a request, but no data in addition to that authorized previously may be sent. This method assumes that there is no other traffic on the network interface that is under its control. It also assumes the existence of a network interface 68 that is capable of reliably buffering at least one complete data packet at the full speed of the network.

The network interface prepares media data to be sent by reading network packet size data chunks from the addresses specified for the appropriate transmit channel, with the last chunk being of arbitrary length, while encapsulating the data in proper header information then sending completed packets to the destination node. The network interface only reads as many bytes as specified. The data packet sent also includes the identifier of the receive channel previously provided by the client.

The received data is then processed by the client in step 94. For reception, the data must be separated from the packet and moved to buffers for use. Traditionally this separation is performed by the client after the packet has been moved into system memory by the network interface. The client then moves the data to the appropriate destination using a software copy loop. However, no system memory buffer copy is possible given the data rates required of broadcast quality video. This traditional method is bypassed in this invention to enhance throughput by minimizing data copying using direct memory access (DMA). The identifier of the receive channel is used along with the state variables of the receive data channel by the network interface under DMA control to transfer the media data portion of the packet directly from the memory 80 network interface into the main memory or other i/o device memory, such as video memory 63 or audio memory 65, thus enhancing throughput, as shown in FIG. 7. After the received data is processed, a window authorization is sent again for more data, in step 92.

As an example, assume that a client wishes to have one megabyte of information from a media file. A read request is sent from the client to the server at the application level to request that amount of data. The one megabyte of information represents a transfer unit. Next, a window authorization is then sent to the server at the transport level authoring one transfer unit to be sent, but that only 16 kilobytes of data to be sent, assuming that the size of the packet FIFO (80 in FIG. 7) at the client is 16 kilobytes. The server then sends the appropriate data from these senders transmit stream only sending a series of packets up to 16 kilobytes. One packet is likely not to be a total of 16 kilobytes, it may be only a small number, e.g., typically approximately 4K bytes. As the client processes the received data, at some point, another window authorization may be sent, for example, authorizing an additional 8K of bytes to be sent. The client will do this after a certain number of bytes of buffer memory in the network interface become available. The server continues to send media data until the number of bytes authorized is exhausted or until the requested transfer unit is exhausted.

Aside from providing real-time access to broadcast quality media data, this system provides numerous advantages over standard multimedia systems. For example, recording digitized media directly onto the server allows a user at a digitized media directly onto the server allows a user at a client computer to play video without having to copy large media files from the server to the client computer. Also, local disk space at each client computer is not needed to hold copies of media files. One copy of each file at the server is all that is needed.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art. For example, fault tolerance may be provided in this system by providing redundancy, for example, redundant interconnect and network subsystems can be added as desired to improve system robustness. These and other modifications are contemplated as falling within the scope of the invention as defined by the appended claims.

What is claimed is:

1. A distributed multimedia network system, comprising:
    a server computer having a disk on which media data is stored:
    a client computer having means for requesting media data from the server computer and means for providing to the server computer a list of media data which may be requested by the client;
    an optical media transport connecting the server computer to the client computer and communicating media data between the client computer and the server computer; and
    in the server, means for retrieving media data from the disk as indicated in the list provided by the client computer caching at the retrieved media data.

\* \* \* \* \*